United States Patent
Schoenike

(10) Patent No.: US 8,720,105 B2
(45) Date of Patent: May 13, 2014

(54) FISHING FLOAT OR STRIKE INDICATOR AND ATTACHMENT METHODS

(76) Inventor: Larry Schoenike, Sun Valley, ID (US)

(*) Notice: Subject to any disclaimer, the term of this patent is extended or adjusted under 35 U.S.C. 154(b) by 333 days.

(21) Appl. No.: 13/019,296

(22) Filed: Feb. 1, 2011

(65) Prior Publication Data

US 2012/0023807 A1 Feb. 2, 2012

Related U.S. Application Data

(63) Continuation-in-part of application No. 11/838,097, filed on Aug. 13, 2007, now Pat. No. 7,877,924.

(60) Provisional application No. 60/837,376, filed on Aug. 11, 2006.

(51) Int. Cl.
*A01K 93/00* (2006.01)
*A01K 91/12* (2006.01)
*A01K 91/16* (2006.01)

(52) U.S. Cl.
USPC ............ 43/44.91; 43/43.1; 43/44.9; 43/44.98

(58) Field of Classification Search
USPC ................. 43/44.9, 44.91, 44.87, 43.1, 44.98
See application file for complete search history.

(56) References Cited

U.S. PATENT DOCUMENTS

| | | | | |
|---|---|---|---|---|
| 171,890 A | * | 1/1876 | Wagner | 43/43.1 |
| 231,417 A | * | 8/1880 | Foote | 43/44.9 |
| 441,447 A | * | 11/1890 | Stahl | 43/43.1 |
| 822,694 A | * | 6/1906 | Shepherd | 43/44.91 |
| 971,420 A | * | 9/1910 | Tannert | 43/44.91 |
| 1,193,912 A | * | 8/1916 | Maire et al. | 43/44.9 |
| 1,480,655 A | * | 1/1924 | Bennett | 43/43.1 |
| 1,618,100 A | * | 2/1927 | Lowry | 43/44.9 |
| 1,848,600 A | * | 3/1932 | Best | 43/43.1 |
| 1,883,574 A | * | 10/1932 | Cleeland | 43/44.9 |
| 1,991,253 A | * | 2/1935 | Kerns | 43/44.9 |

(Continued)

FOREIGN PATENT DOCUMENTS

| FR | 2722367 A1 | * | 1/1996 | A01K 93/00 |
|---|---|---|---|---|
| GB | 2298772 A | * | 9/1996 | A01K 93/00 |

(Continued)

OTHER PUBLICATIONS

Packaging and instructions for Frog Hair® strike indicators, 2004.

*Primary Examiner* — Darren W Ark
(74) *Attorney, Agent, or Firm* — Pedersen and Company, PLLC; Ken J. Pedersen; Barbara S. Pedersen

(57) ABSTRACT

A float and/or strike indicator for fly fishing may be attached by friction/interference fit onto a line or leader, by sliding the float up the leader to a thicker-diameter portion of the leader for a tight fit between the leader and an axial bore in the float. The bore may be tapered in diameter, may have a constant diameter, may have a significantly reduced or tapered diameter or another restriction in a portion(s) of the bore, and/or may have an enlarged end opening, for example. The floats may include one or more protrusions into which a small diameter end of the axial bore extends, and, during installation on the line/leader, the protrusion may be removed but snapping or cutting to reveal the bore so that that line/leader may be inserted all the way through the float and accessed at the small diameter end of the bore.

19 Claims, 10 Drawing Sheets

(56) References Cited

U.S. PATENT DOCUMENTS

| | | | |
|---|---|---|---|
| D107,418 S * | 12/1937 | Ganaway | 43/44.9 |
| 2,184,187 A * | 12/1939 | Hildebrandt | 43/44.98 |
| 2,186,281 A | 1/1940 | Cochran | |
| 2,241,367 A * | 5/1941 | Sarff | 43/43.2 |
| 2,315,322 A * | 3/1943 | Fenley | 43/44.9 |
| 2,500,078 A * | 3/1950 | Ingram | 43/44.91 |
| 2,591,558 A | 4/1952 | Kramer | |
| 2,599,973 A * | 6/1952 | Bujaky | 43/44.91 |
| 2,693,049 A * | 11/1954 | Atton | 43/44.9 |
| 2,713,742 A | 7/1955 | Holdaway | |
| 2,754,616 A * | 7/1956 | Law | 43/44.91 |
| 2,770,910 A * | 11/1956 | Gehrig | 43/44.9 |
| 2,860,443 A | 11/1958 | Robinson | |
| 2,874,511 A * | 2/1959 | Hettrick | 43/44.87 |
| 2,881,551 A * | 4/1959 | Atton | 43/44.9 |
| 2,883,785 A | 4/1959 | Croft | |
| 2,888,771 A * | 6/1959 | Stephens et al. | 43/44.91 |
| 2,984,931 A * | 5/1961 | Shaw | 43/44.91 |
| 3,029,544 A | 4/1962 | Dimatteo | |
| 3,084,470 A * | 4/1963 | Heater | 43/44.91 |
| 3,104,488 A * | 9/1963 | Hicks | 43/44.91 |
| 3,192,662 A * | 7/1965 | Hoyle | 43/44.9 |
| 3,404,482 A * | 10/1968 | Maske | 43/44.9 |
| 3,453,769 A * | 7/1969 | Chandler | 43/44.98 |
| 3,464,140 A * | 9/1969 | Carabasse | 43/44.98 |
| 3,628,279 A * | 12/1971 | Halone | 43/44.9 |
| 3,701,212 A * | 10/1972 | Gilliam | 43/44.9 |
| 3,717,907 A * | 2/1973 | Klein | 43/44.9 |
| 3,758,979 A * | 9/1973 | Martuch et al. | 43/44.98 |
| 3,778,871 A * | 12/1973 | Ratte, Jr. | 43/44.87 |
| 3,782,025 A * | 1/1974 | Kochevar | 43/44.9 |
| 3,805,439 A * | 4/1974 | Krengel et al. | 43/43.1 |
| 3,831,309 A * | 8/1974 | Martuch | 43/44.98 |
| 3,834,061 A * | 9/1974 | Klein | 43/44.9 |
| 3,857,645 A * | 12/1974 | Klein | 43/44.9 |
| 3,864,865 A * | 2/1975 | Swisher | 43/44.98 |
| 3,871,123 A * | 3/1975 | Olson | 43/44.98 |
| 3,885,339 A * | 5/1975 | Herkner | 43/42.36 |
| 3,947,990 A * | 4/1976 | Johnson | 43/44.9 |
| 3,988,852 A * | 11/1976 | Klein | 43/44.91 |
| 4,048,744 A * | 9/1977 | Chandler | 43/44.98 |
| 4,090,463 A * | 5/1978 | Soderberg | 43/44.91 |
| 4,117,619 A * | 10/1978 | Stevenson | 43/43.1 |
| 4,145,833 A * | 3/1979 | Ratte | 43/44.91 |
| 4,165,578 A * | 8/1979 | Klein | 43/44.8 |
| 4,177,598 A * | 12/1979 | Jolley | 43/42.49 |
| 4,205,477 A * | 6/1980 | Fajt, Jr. | 43/44.91 |
| 4,215,505 A * | 8/1980 | Henze et al. | 43/44.9 |
| 4,459,775 A * | 7/1984 | Ratte | 43/44.91 |
| 4,472,903 A * | 9/1984 | Hutson | 43/44.91 |
| 4,563,831 A * | 1/1986 | Gibney | 43/44.91 |
| 4,604,821 A * | 8/1986 | Moser | 43/44.98 |
| 4,610,104 A * | 9/1986 | Garcia | 43/44.9 |
| 4,615,136 A * | 10/1986 | Bank | 43/44.91 |
| 4,644,681 A * | 2/1987 | Hutson | 43/44.91 |
| 4,649,663 A * | 3/1987 | Strickland | 43/44.9 |
| 4,727,676 A * | 3/1988 | Runyan | 43/43.1 |
| 4,796,377 A | 1/1989 | Hosegood et al. | |
| 4,803,798 A * | 2/1989 | Hannah | 43/44.91 |
| 4,823,495 A | 4/1989 | Camilleri | |
| 4,837,966 A * | 6/1989 | Bethel | 43/44.9 |
| 4,864,767 A | 9/1989 | Drosdak | |
| 4,987,697 A * | 1/1991 | Klein | 43/44.83 |
| 5,014,459 A * | 5/1991 | Sublet | 43/43.1 |
| 5,042,190 A * | 8/1991 | Calvin | 43/44.91 |
| 5,157,860 A * | 10/1992 | Clark | 43/44.91 |
| 5,165,195 A * | 11/1992 | Matsui | 43/44.9 |
| 5,197,220 A * | 3/1993 | Gibbs et al. | 43/44.9 |
| 5,207,016 A * | 5/1993 | Pate | 43/44.9 |
| 5,216,831 A * | 6/1993 | Halterman, Jr. | 43/44.91 |
| 5,239,770 A * | 8/1993 | Kohus | 43/44.91 |
| 5,279,066 A * | 1/1994 | Camera | 43/44.9 |
| 5,359,804 A * | 11/1994 | Burns | 43/44.91 |
| 5,377,444 A * | 1/1995 | Gibney, Sr. | 43/44.91 |
| 5,381,622 A * | 1/1995 | Tregre | 43/44.9 |
| 5,388,368 A * | 2/1995 | Lawrence | 43/44.9 |
| 5,456,041 A * | 10/1995 | Schoeberlein | 43/44.91 |
| 5,459,959 A * | 10/1995 | Paradis | 43/44.91 |
| 5,469,652 A * | 11/1995 | Drosdak | 43/44.98 |
| 5,555,668 A * | 9/1996 | Brasseur | 43/43.1 |
| 5,661,922 A * | 9/1997 | Bonomo | 43/44.9 |
| 5,678,351 A * | 10/1997 | Halterman, Jr. | 43/43.1 |
| 5,718,077 A * | 2/1998 | Meinel | 43/44.98 |
| 5,758,451 A * | 6/1998 | Wolfe | 43/44.91 |
| 5,784,828 A * | 7/1998 | Thompson | 43/44.9 |
| 5,784,829 A * | 7/1998 | Latta | 43/44.91 |
| 5,845,430 A * | 12/1998 | Nakano et al. | 43/44.98 |
| 5,852,894 A * | 12/1998 | Shannon et al. | 43/44.9 |
| 5,887,378 A | 3/1999 | Rhoten | |
| 6,009,659 A | 1/2000 | Shannon et al. | |
| 6,125,574 A * | 10/2000 | Ganaja et al. | 43/44.9 |
| 6,170,192 B1 * | 1/2001 | Nakano et al. | 43/44.98 |
| 6,421,950 B1 * | 7/2002 | Constantin | 43/44.98 |
| D462,413 S | 9/2002 | Teegarden | |
| 6,519,894 B1 * | 2/2003 | Geary | 43/44.9 |
| 6,745,511 B1 * | 6/2004 | Falconer | 43/44.9 |
| 6,880,289 B1 * | 4/2005 | Yin | 43/44.98 |
| 6,910,296 B2 * | 6/2005 | Blette et al. | 43/43.1 |
| 7,003,911 B2 * | 2/2006 | Schoenike | 43/44.91 |
| 7,475,510 B2 * | 1/2009 | Franklin | 43/44.91 |
| 7,490,433 B2 * | 2/2009 | Schoenike | 43/44.91 |
| 7,494,162 B1 * | 2/2009 | Howell | 289/17 |
| 7,546,704 B1 * | 6/2009 | Canales | 43/44.9 |
| 7,610,715 B2 * | 11/2009 | Cowin | 43/44.91 |
| 7,614,179 B2 * | 11/2009 | Kavanaugh | 43/44.91 |
| 7,654,032 B1 * | 2/2010 | Fricke | 43/44.91 |
| 7,861,457 B2 * | 1/2011 | Blette et al. | 43/44.9 |
| 7,877,924 B2 * | 2/2011 | Schoenike | 43/44.91 |
| 8,276,311 B2 * | 10/2012 | Cowin | 43/44.91 |
| 2002/0095853 A1 | 7/2002 | Teegarden | |
| 2003/0041502 A1 * | 3/2003 | Mauri et al. | 43/44.98 |
| 2004/0250463 A1 * | 12/2004 | Haines | 43/54.1 |
| 2005/0022441 A1 * | 2/2005 | Blette et al. | 43/43.1 |
| 2005/0028426 A1 * | 2/2005 | Blette et al. | 43/43.1 |
| 2005/0034356 A1 * | 2/2005 | Blette et al. | 43/44.9 |
| 2005/0039376 A1 * | 2/2005 | Blette et al. | 43/43.1 |
| 2006/0130389 A1 * | 6/2006 | Annelin | 43/44.98 |
| 2009/0013585 A1 * | 1/2009 | Acworth et al. | 43/44.91 |
| 2009/0049735 A1 * | 2/2009 | Westover | 43/44.87 |
| 2009/0056197 A1 * | 3/2009 | Schoenike | |
| 2009/0255165 A1 * | 10/2009 | Myers | 43/44.91 |
| 2010/0293835 A1 * | 11/2010 | Cowin | 43/44.91 |
| 2013/0014427 A1 * | 1/2013 | Rothan | 43/43.1 |

FOREIGN PATENT DOCUMENTS

| | | | | |
|---|---|---|---|---|
| JP | 08126453 A * | 5/1996 | | A01K 93/00 |
| JP | 08228650 A * | 9/1996 | | A01K 93/00 |
| JP | 10178994 A * | 7/1998 | | A01K 93/00 |
| JP | 11346617 A * | 12/1999 | | A01K 93/00 |
| JP | 2000060386 A | 2/2000 | | A01K 93/00 |
| JP | 2000078942 A * | 3/2000 | | A01K 93/00 |
| JP | 2003204743 A * | 7/2003 | | A01K 93/00 |
| JP | 2006204216 A * | 8/2006 | | A01K 93/00 |
| JP | 2006223282 A * | 8/2006 | | A01K 93/00 |
| JP | 2010035443 A * | 2/2010 | | A01K 93/00 |
| JP | 2010057452 A * | 3/2010 | | A01K 93/00 |

* cited by examiner

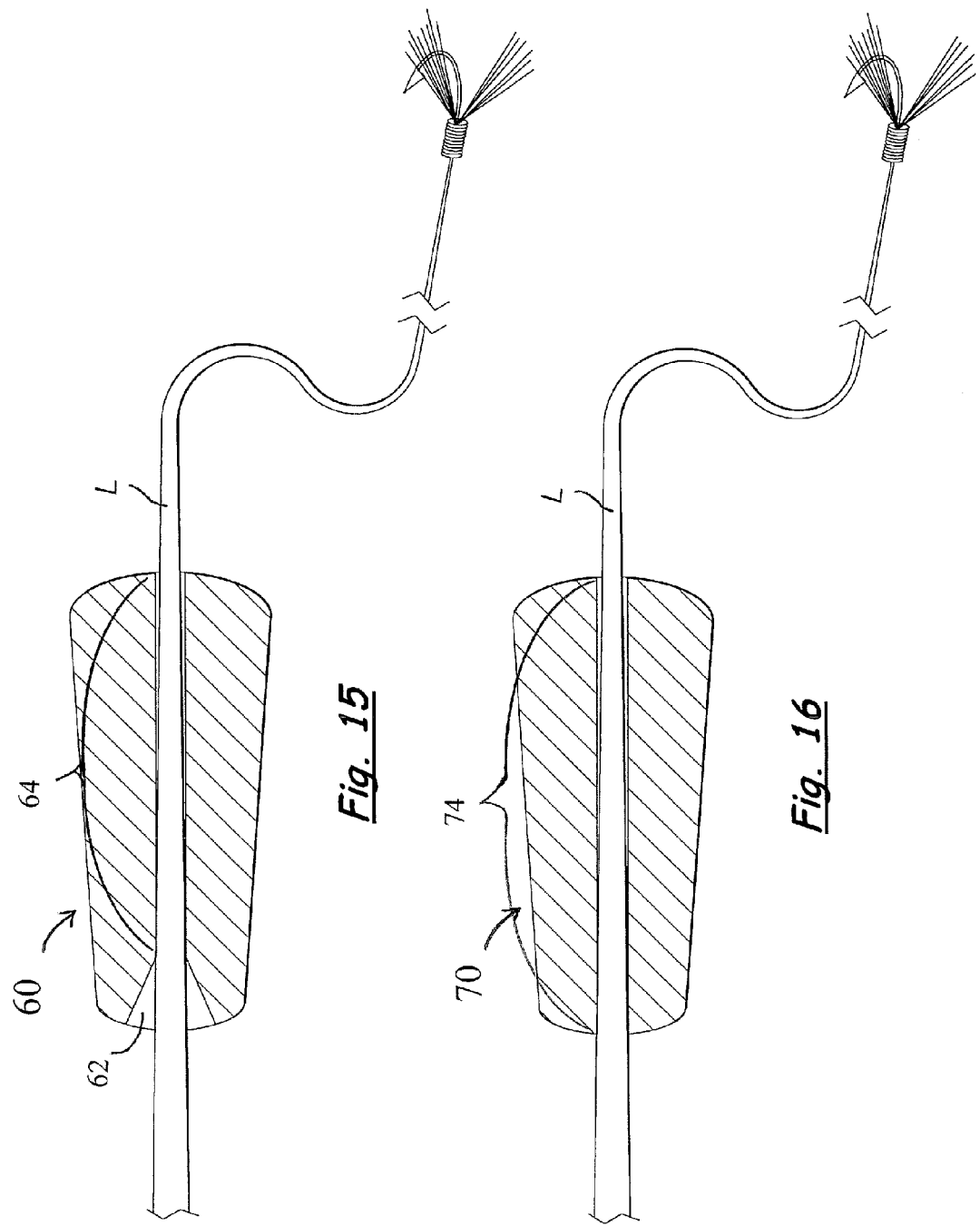

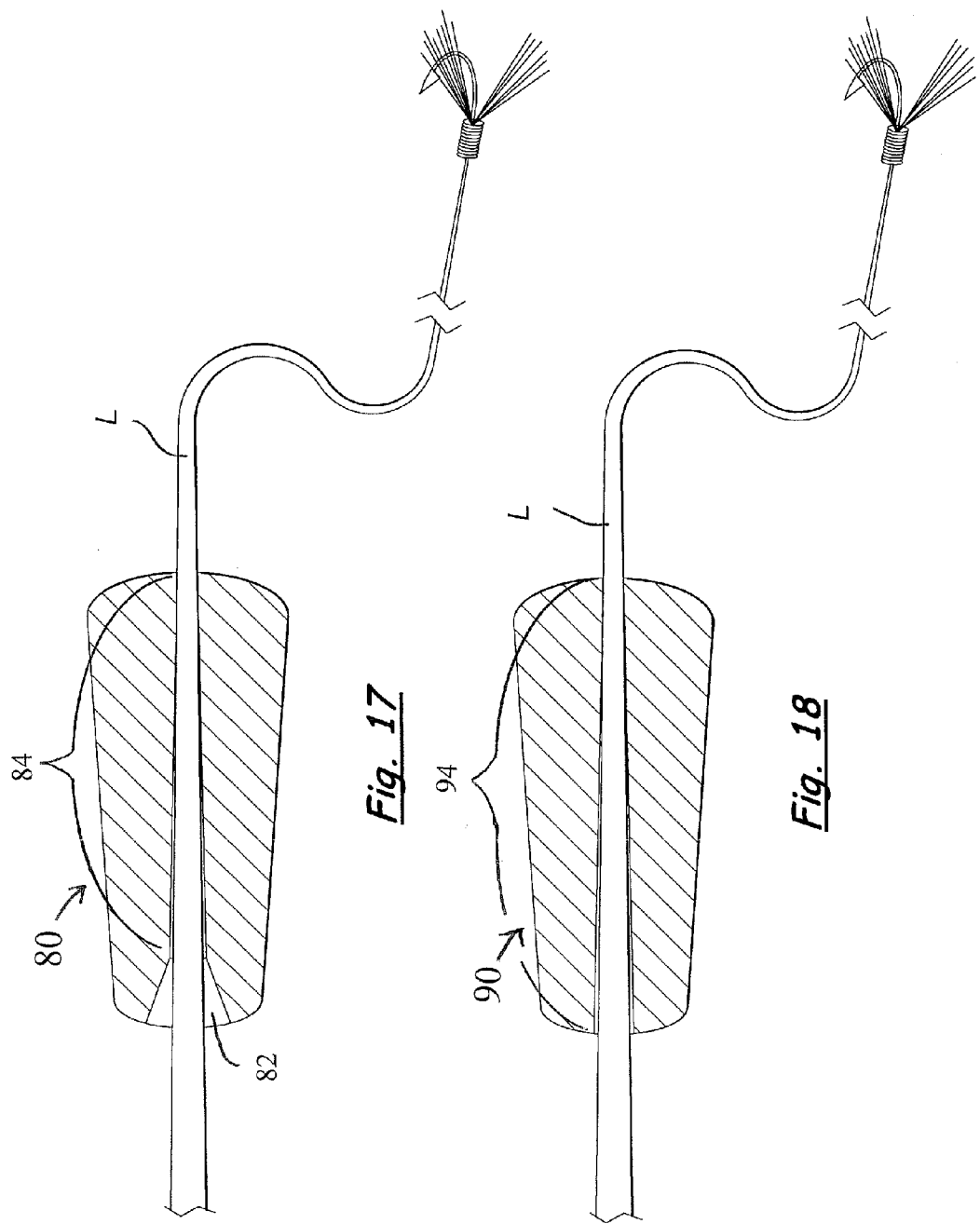

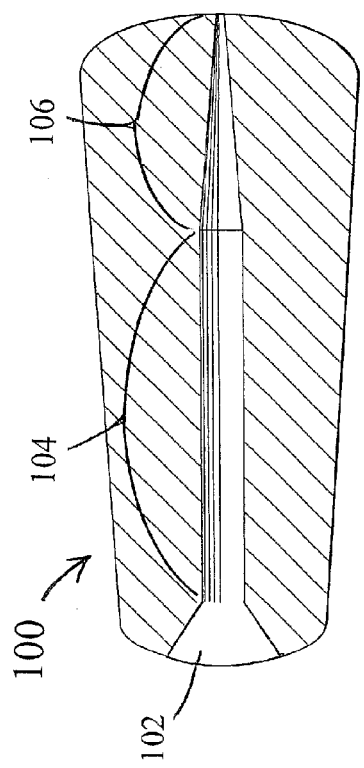
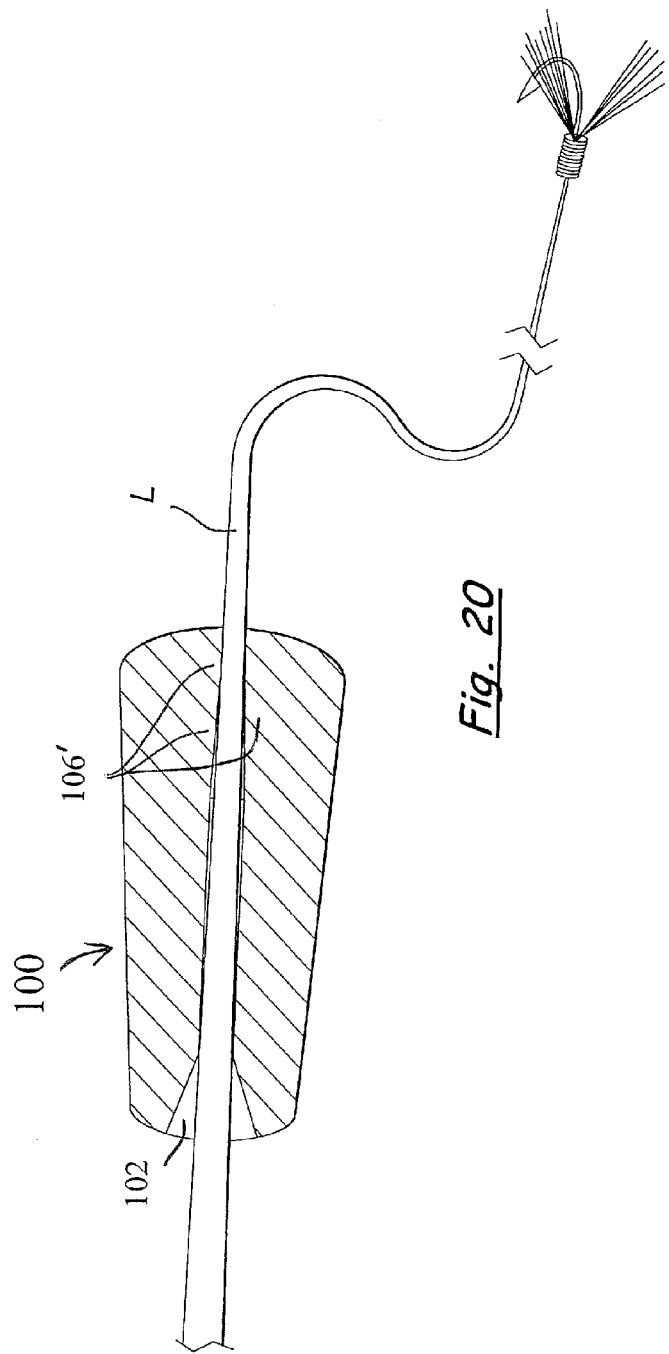
Fig. 19
Fig. 20

FISHING FLOAT OR STRIKE INDICATOR AND ATTACHMENT METHODS

This application is a Continuation-in-Part of application Ser. No. 11/838,097, filed on Aug. 13, 2007, and issuing as U.S. Pat. No. 7,877,924 on Feb. 1, 2011, which claims benefit of Provisional Application Ser. No. 60/837,376, filed Aug. 11, 2006, the entire disclosures of which are hereby incorporated by this reference.

BACKGROUND OF THE INVENTION

1. Field of the Invention

The present invention relates to strike indicators or floats for various methods of fishing, and attachment methods for said indicators or floats. More specifically, the invention relates to indicators or floats that are attached to a fishing line or leader substantially by a friction-fit or interference-fit between the line/leader and the indicator/float and/or by the line/leader being threaded or slid through a circuitous path in the indicator/float.

2. Related Art

Fishing floats are common in both lure, live bait, and fly fishing, and many attachment systems are known for attaching the floats to lines and leaders. In lure or live bait fishing, where total weight of the fishing setup is not so critical, many floats are tied, hooked, or clipped onto fishing lines, for example, using spring-loaded hooks or clips. In fly fishing, where total weight is of great importance, the floats, which act as strike indicators, are often "gripped" onto a leader, using a rubber gripping member or "grommet." Such a grommet extends all the way through a longitudinal bore in the float and protrudes from each end of the float. Such a grommet is typically an elastic tube, or an elongated, elastic strap with enlarged ends. Typically, the grommet is stretched by the fisherman so that the grommet becomes longer and thinner to provide room for the leader to be slid into the bore by means of a side slot that runs end-to-end on the float. Once the resilient grommet is released by the fisherman, the grommet contracts to its normal length and thickness and, in doing so, expands to fill the bore space and hold the leader inside the float.

More recently-developed, alternative fly fishing float attachment systems comprise rubbery or otherwise resilient grippers at or near each end of the float. These grippers encircle the leader at or near the ends of the floats but do not extend continuously through the float. For example, see FIGS. 1 and 2. FIG. 1 illustrates a float F, with two generally tubular prior art grippers GT on the leader L and inside the float F. These tubular grippers GT are each about ⅕-⅓ as long at the float, and the leader extends through the hollow center of each gripper, with a snug fit of the leader in the gripper. Each gripper GT resides inside the end of the bore of the float, as shown in FIG. 1, forming a snug fit of the gripper with the interior surface of the bore. Thus, the grippers GT connect the leader to each end of the float. The float with pre-installed grippers GT is supplied in the retail package with a thin looped wire (not shown) pre-installed through the grippers and float; the user installs the float and gripper assembly on a leader by inserting the leader through the loop of the wire, and pulling the other end of the wire away from the float to pull the loop with the trapped leader also through the float and grippers. This technique is much like needle-threading devices known in the hand-sewing arts. Such a float and gripper assembly is a "one-use" assembly, which is not usable on a different leader.

FIG. 2 illustrates a prior art float F and gripper embodiment, generally similar to that in FIG. 1, but wherein the grippers GB are generally oval-shaped and wherein the user may install the float and grippers on the leader before "snugging" the grippers into the ends of the float. The fairly complex installation method recommended for this apparatus results in the two grippers gripping the leader tightly and also gripping the float tightly.

These prior art methods of attaching a float to a fly fishing leader are fairly light-weight options, but still there is a need for an improved attachment system. Still, there is needed an improved float that may be used in various forms of fishing, but that is sufficiently light weight for fly fishing and that is easy to use.

SUMMARY OF THE INVENTION

The present invention comprises embodiments of a float, and methods for attaching the floats, which comprise friction-fit or interference-fit of the float directly to the leader/line. In fly fishing applications, the float will often serve as a strike indicator as it floats downstream ahead of, or near, the fly. The float may include a constant diameter bore, a changing-diameter bore, a tapered bore, a combined constant and tapered bore, a circuitous bore, or other bores that provide said friction-fit or interference-fit between the leader/line and a surface of the bore. An optional slot may be provided from the outer surface of the float to the bore, for example, a straight slot, a Z-shaped slot, or other circuitous slot including curved, non-planar slots. A circuitous slot may provide additional resistance to the leader sliding out through the slot. In cases wherein the float is attached to a tapered fly-fishing leader, the taper of the leader may assist in the friction or interference fit by means of the user pulling a larger-diameter portion of the leader into the float so that the leader is more tightly wedged in the float. The leader/line may be inserted longitudinally, or slid sideways, into the float. Preferably, there are no separate connection members, for example, no rubbery grommets, tubes, ovals, or balls and no hooks or clamps that connect the float to the leader/line. Preferably, there is no tying of the line/leader to the float.

In a first set of embodiments, the float is attached to a fly fishing leader by friction and/or interference, in that the leader fits snugly into at least a portion of a generally straight longitudinal bore of the float, so that the float typically will not slide along the leader unless purposely slid relative to the leader by the fisherman or other person. In a second set of embodiments, the float is attached to a line or leader by the line or leader being inserted into the float through a circuitous path/slot to reach a preferably-straight longitudinal bore, in which longitudinal bore the line or leader is preferably snugly captured so that the float will not slide along the leader or slide out of the circuitous path/slot unless purposely loosened and removed by the fisherman or other person. In a third set of embodiments, a protrusion extends from one end of the float, wherein the protrusion has a closed or substantially-closed outermost surface but has an hollow portion in its interior, which hollow portion is an end of the longitudinal bore provided for receiving the line/leader. The protrusion is significantly smaller in dimension and diameter than the main body of the float, and may be snapped or cut off easily to reveal at least a portion of the hollow portion/bore-end. This way, a line/leader may be inserted in the opposite end, through the float and out of the float through the revealed bore-end. In these three sets of embodiments, the installed float is secured so tightly that it is not moveable, and does not move, relative to the leader during use, and is preferably only moveable if the user purposely grasps and forces the float toward the tip end of the leader.

BRIEF DESCRIPTION OF THE DRAWINGS

FIGS. 15 and 16 are cross-sectional side views of another embodiment of float according to the invention, wherein the float of FIG. 15 has a constant diameter throughout the bore except for an enlarged end opening at one end of the float. The float of FIG. 16 is the same as the float in FIG. 15 except without said enlarged end opening.

FIGS. 17 and 18 are cross-sectional side views of another embodiment of float according to the invention, wherein the float of FIG. 17 has a slightly-tapered diameter throughout the bore plus an enlarged end opening at one end of the float. The float of FIG. 18 is the same as the float in FIG. 17 except without said enlarged end opening. The leaders in FIGS. 17 and 18 are not shown in cross-section.

FIGS. 19 and 20 are cross-sectional side views of another embodiment of float according to the invention, wherein the bore of the float comprises a constant or nearly constant bore in the middle region of the float, a significantly-tapered/restricted end at one end of the float, and an opposite enlarged end. FIG. 19 portrays the float before attachment to the leader, and FIG. 20 portrays the float having been installed on a tapered leader, wherein the leader in FIG. 20 is not shown in cross-section.

FIG. 23 has a tapered bore, with the diameter smoothly decreasing from one end to the other, without any "corners" or abrupt changes in diameter. FIG. 24 has a smoothly tapered bore, with a flared bore end at the small end of the float, which makes line/leader insertion easier. FIG. 25 has a bore with a straight main region (non-tapered) and tapered ends; the bore tapers to a larger diameter at the small end of the float, and the bore tapers to a small diameter at the large end of the float.

DETAILED DESCRIPTION OF PREFERRED EMBODIMENTS

Referring to the Figures, there are shown several, but not the only, embodiments of the invented float and method for attaching floats to fishing lines or leaders. For convenience, the term "float" is used throughout this description, but, especially for fly fishing applications, "indicator" or "strike indicator" would serve as well, because the main purpose of the device in fly fishing is to float at or near the water surface after the fly has been laid-out and to indicate by its movement that a fish strike has occurred.

In some embodiments, a bore is provided through the float and the float is attached by means of the float fitting tightly on the leader by a tight fit between at least part of the float bore surface and at least a part of the line/leader. In the case of a fly fishing leader, embodiments of the invention utilize the shape of the leader, which is smoothly tapered from a small diameter end to a large diameter end, to form a tight fit between the leader and the surface of the bore along at least part of the length of the bore.

Figure 3:
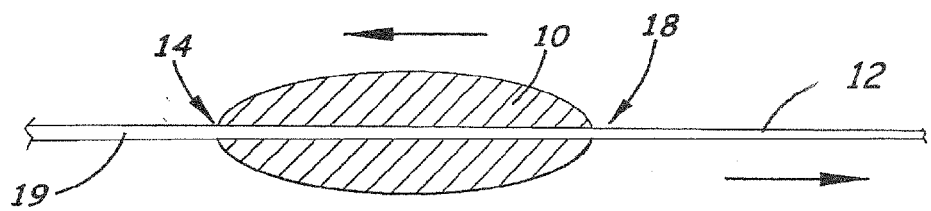
FIG. 3 illustrates a side cross-sectional view of one embodiment of the invention, wherein the float is being attached to the leader by engagement of the float directly with the leader, rather than by use of separate gripping, hook, or clamp members. A leader is inserted into the longitudinal bore of a float and the leader is pulled relative to the float to move a thicker portion of the leader into engagement with the longitudinal bore of the float. The float is shown in cross-section, but the leader is not.

FIG. 3 illustrates a float 10 according to one embodiment of the invention, wherein the narrow (small diameter) end 12 of the leader has been inserted through the bore 14 of the float, by simply inserting it (by virtue of its own slight rigidity) into and through the bore 14. Less preferably, a threading tool of some sort may be used to assist in "threading" the leader axially through the bore, but, with preferred embodiments of the invention, such a threading tool is not needed and not desired. The inventor prefers embodiments wherein no threading tools, and no other tools or attachments, are needed to install and use the float. A conventional leader, and even the tippet of a conventional leader (or "tip end," the thin distal end of the leader), is stiff enough to be pushed through the bore of the preferred embodiments, so that no tools are needed.

Once the leader 18 is all the way through the bore and its narrow end 12 may be accessed (to the right in FIG. 3), the narrow end 12 is pulled to the extent that the leader 18 slides through the bore until it is trapped or "stuck" in the bore (by virtue of the larger diameter of the thick leader portion 19 to the left in FIG. 3). The central bore of the bore may be made with a single diameter, or may be tapered to better fit a tapered leader, for example. Depending on the shape, taper, and diameter(s) of the bore, how hard the fisherman pulls on the leader, and the characteristics of the material of the float, for example, various amounts of the leader inside the bore may be very tight in the bore. It may be that all or substantially all of the leader inside the bore may be in film and tight contact with the bore surface, or it may be that only a portion of the leader in the bore (for example, the left half of the leader portion that is in the bore in FIG. 3) is tight in the bore. It is desired that the leader be pulled hard enough to "wedge" the leader in the bore along the majority of the bore length, and, more preferably, along at least ¾ of the bore length. This will firmly attach the float to the leader, and do so without the need for hooks, clamps, grommets, gripper tubes, other grippers, or tying. Although the floats of the preferred embodiments may be said to "grip" the line or leader, or vice versa, it is understood that this is accomplished by friction or interference between the float surface (unaided by other members) and the line or leader surface, and not by an intermediate member. Such an attachment preferably consists only of a tight fit between the leader and the surface of the bore.

The fisherman may typically remove the float by pulling in the reverse direction to loosen the leader in the float by moving more of the narrow portion of the leader into the bore. This method of frictional/interference attachment also provides a distinct benefit of being able to remove the float from the leader and reuse the float on another leader and/or at another time.

Current conventional leaders are typically made of nylon and/or fluorocarbon, but the leaders in this application also may be other materials. The preferred floats according to the invention are made of polystyrene (preferably), polyurethane, or other polymers that are preferably more compressible than the conventional leader. This combination of materials results in the float being more compressible than the leader, and, therefore, the preferred friction and/or interference fit may comprise some compression of the float when the user pulls the leader into a tight fit with the float. This will particularly be true if the surface of the float bore, prior to the float being installed on the leader, does not match the leader outer surface in shape; restrictions in the float bore that are not consistent with the shape of the leader will tend to be compressed during the action of pulling the small portion of the leader to wedge a larger portion of the leader in the bore.

Figure 4:
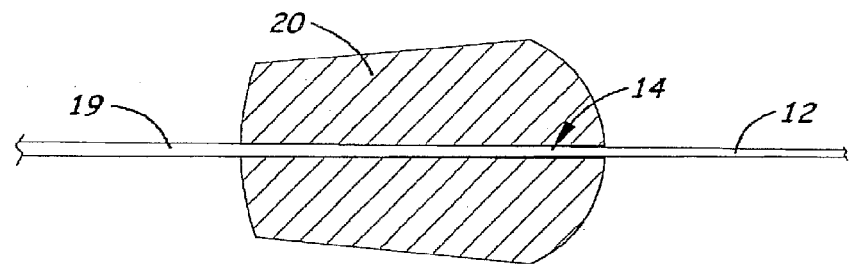
FIG. 4 is a side cross-sectional view of an alternative embodiment of a float with a longitudinal bore. The float is attached to the leader by the method illustrated in FIG. 3, that is, with a friction fit between a thick portion of the leader and at least a portion of the longitudinal bore of the float. The float is shown in cross-section, but the leader is not.

FIG. 4 illustrates another embodiment of float 20 attached in a way similar to that shown in FIG. 3. Many different shapes and sizes of floats are adaptable to be used in embodiments of the invention. In FIG. 4, one may see that the thicker portion 19 of the leader is in the left portion of the bore, and the leader tapers to a smaller diameter narrow portion 12 toward the right of the figure. This float 20 is tightly held on the leader 18 by virtue of this "wedging" of the leader 18 in the bore 14.

Figure 5:
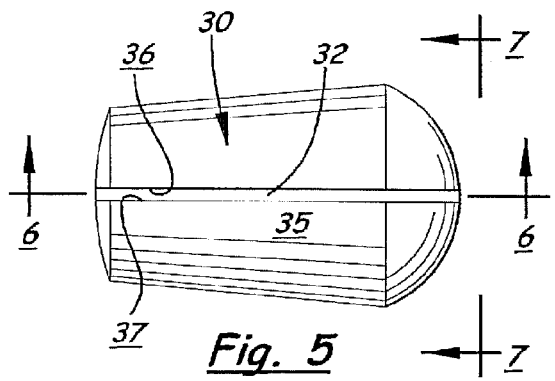
FIG. 5 is a side view of an alternative embodiment of float having a side slot that extends to generally the centerline of the float to form and/or to connect to a longitudinal axis bore of the float.
Figure 6:
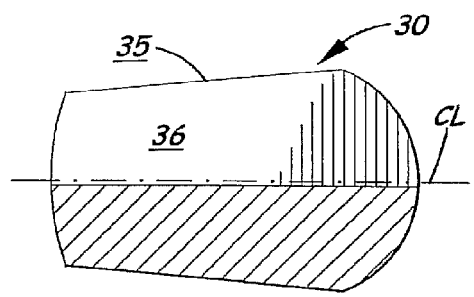
FIG. 6 is a cross-sectional view of the float of FIG. 5, viewed along the line 6-6 in FIG. 5.
Figure 7:
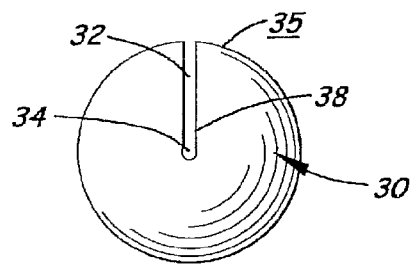
FIG. 7 is an end view of the float of FIGS. 5 and 6, viewed along the line 7-7 in FIG. 5.
Figure 8:
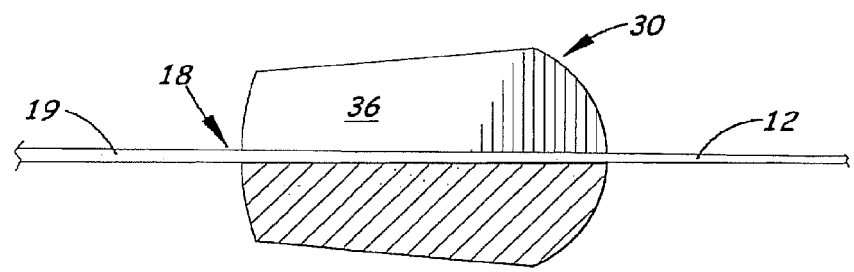
FIG. 8 is a cross-sectional view of the float of FIGS. 5-7, with the float attached to the leader by friction fit between a thick portion of the leader and at least a portion of the longitudinal bore of the float, after the leader has been inserted into the float by means of the side slot.

Alternative floats and methods include providing a "slit" or "slot" into the float to provide for "side-ways" insertion of the line or leader into the float. In the embodiment of FIG. 5-8, a float 30 generally of the same shape as the float in FIG. 4 is provided, with the addition of a side slot 32 all the way along the length of the float and extending all along the float 30 as far as the longitudinal axis bore 34. This way, the float is "slit" from one side surface 35 as far as the centerline (CL, shown in dashed lines in FIG. 6), wherein the centerline lies on the plane of the slit/slot. This is best illustrated in FIGS. 5 and 6. In FIG. 5, the side view, facing the slot 32 allows the viewer to, in effect, look into the slot 32. In the cross-sectional view of FIG. 6, the float 30 has been sliced along the central plane of the slot, so that the upper half of FIG. 6 reveals one of the slot walls 36, and the lower half of FIG. 6 shows the sliced body of the float.

Figure 1:
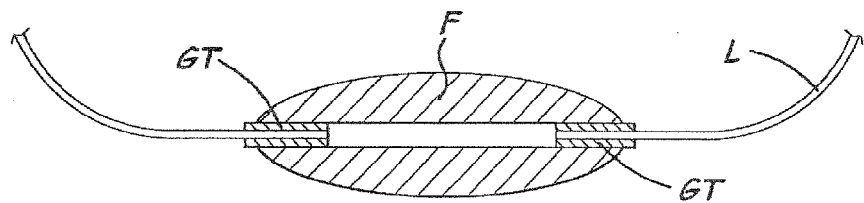
FIG. 1 illustrates a prior art method of float attachment, wherein two generally tubular rubbery grippers are fixed in the ends of the float.
Figure 2:
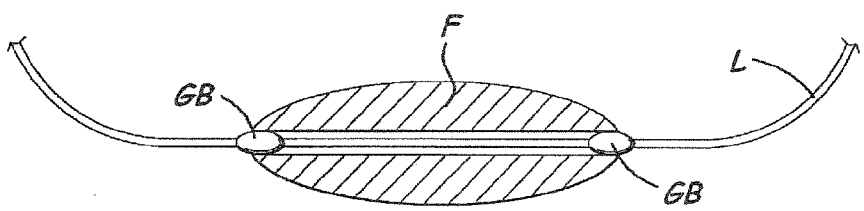
FIG. 2 illustrates another prior art method of float attachment, wherein two generally oval-shaped grippers are pushed into the ends of the float.

To attach the float 30 onto the leader 18, the leader 18 is slid "sideways" through the slot 32 to the "bottom" of the slot, which bottom is preferably the longitudinal bore 34 at the central axis of the float. This method of insertion of the leader is easier than "threading" the leader axially through the bore as discussed above regarding FIG. 3. This float style and method of insertion is especially desirable because it allows the float 30 to be installed even on a leader that has had tippet material tied onto it after the original tippet has broken or been cut. This type of embodiment, that is, with a sideways slot, can be installed on the leader above a tippet knot as it does not have to be slid axially all the way from the tippet end to the thicker end. The float may be slid sideways onto the leader above the tippet knot and then slid a little further to tighten the float on the thicker portion by friction/interference. This is a distinct advantage compared to the prior art floats in FIGS. 1 and 2, which are installed only axially on the leader and are held by grippers, and which cannot be installed on the leader above a tippet knot because the knot will not fit through the grippers.

The tightness of the leader 18 in the slot 32 depends upon whether the narrow portion 12 or a thicker portion 19 of the leader is being inserted, and most fishermen will choose to slide the narrow portion 12 into the bore 34 via the slot 32 and then slide the float 30 along the leader 18 toward the thicker end to be tight on the thicker portion 19 of the leader after the leader is in the bore 34.

The slot 32 preferably is sized to provide a close, but not tight, fit between the narrower portion 12 of the leader and the slot walls (36, 37) all the way through the slot. Alternatively, the fit between the narrower portion 12 and the slot walls (36, 37) may be fairly loose until the region of the slot walls very near the bore; in such a case of loose fit between leader 18 and slot 32, the leader 18 would be snapped past a restriction (not shown, but typically at the region 38) near the bore, or part of the bore, in order to "snap into" the bore 34. Preferably, the bore is loose enough to receive the narrower portion 12 of the leader fairly easily, but then to tighten on the leader as the float is slid axially to the thicker portion. This way, it will be fairly easy and comfortable for the fisherman to slide the float sideways onto the thinner portion of the leader (even past a close or snug fit between the side-slot and the leader) and then, after the float is on the leader, to apply axial force (sliding the float axially relative to the leader) that is sufficient to "lock" the float onto the thicker portion of the leader. Thus, the fine motor skills of sliding the float sideways are applied before the relatively more gross motor skills and greater force are used to "lock" the float on the leader. Still, this method of frictional/interference attachment allows for removal of the float from the leader and reuse of the float on another leader and/or at another time.

While the float embodiments having slots may be described as having both a slot or slots and a bore, it is to be understood that the slot may be continuous generally to the central axis of the float and there may not need to be a bore structure that is different from the "bottom" extremities of the slot(s). In other words, the bore may not be a structure separate from the slot(s), but instead may be simply the bottom of the slot(s). Alternatively, a separate bore may be formed by drilling or otherwise boring end-to-end through the float. Whether formed as the bottom part of a side-ways slot or formed by being separately drilled or bored, a bore that extends along the central axis of the float or otherwise straight through the float may be called a "straight bore."

The slot in the float may be various sizes and shapes, and may include non-straight slots. Preferably, the slot extends all the way to the central axis all the way along the slot length, as this provides for the leader to be generally centered in the float. Typically, the float body will be symmetrical around the central axis, and the leader will be longitudinally centered in the float, resulting in a more predictable fly cast and lay-out of the fly.

Alternative floats include a non-straight slot for insertion of the leader/line, which slot preferably terminates at the central axis of the float to create the bore. As discussed above, the slot and bore need not be two separate features or made by two separate steps, and the bore may simply be described as the bottom of the slot. In FIGS. 9-13, a float 40 has what may be called a "Z-shaped slot" or a "Z-side-slot" 42, wherein each end of the float has a slot that extends to the bore 45 at the central axis but wherein the slots at the two ends either: 1) either extend in opposite directions from the bore (wherein, they may be on the same plane but extending away from each other, in other words at 180 degrees from each other), or 2) are on different planes. Because the slots at the ends of the float connect and communicate with each other, they may be called "slot portions."

In the embodiment of FIGS. 9-13, the end slot portions 43, 44 are 180 degrees from each other, so they may be said to extend in opposite directions from the bore 45 on the same plane. A transverse slot portion 46 extends from the outside surface of the float 40, at an angle to the length of the float, and connects to, and communicates with, both the "right and left" end slot portions 43, 44 and may be said to form a small part of the bore 45 at the intersection of the right and left end slots 43, 44. The bottoms of each of the end slot portions 43, 44 form the left and right portions of the bore (using the orientation of FIGS. 9 and 12), and the end slot portions 43, 44 join generally in the middle of the float when they communicate with the transverse slot (see 47 in FIGS. 9 and 12).

Figure 9:
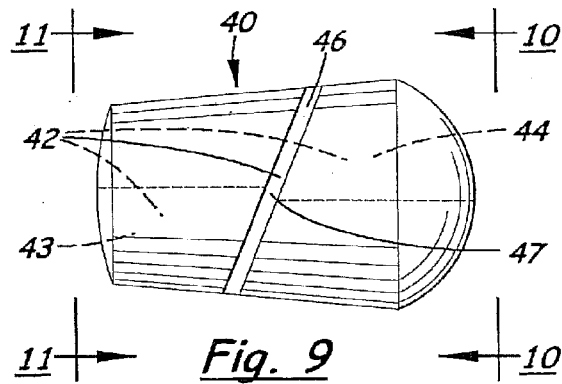
FIG. 9 is an alternative embodiment of the float having a "Z-side-slot," which is one embodiment of a circuitous path for insertion of the leader, wherein the two end slot portions are 180 degrees away from each other.
Figure 10:
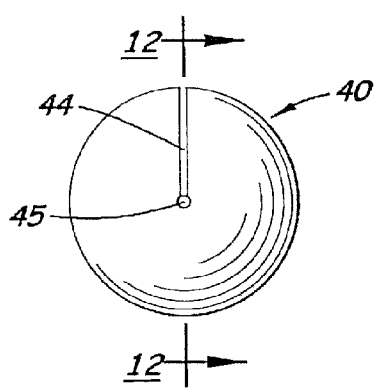
FIG. 10 is an end view of the float of FIG. 9, viewed along the line 10-10 in FIG. 9.
Figure 11:
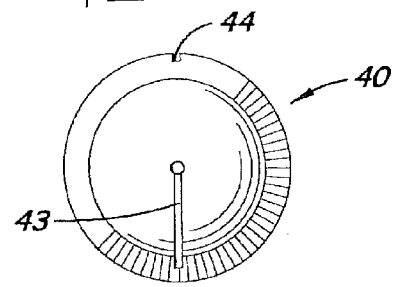
FIG. 11 is an end view of the float of FIG. 9, viewed along the line 11-11 in FIG. 9.
Figure 12:
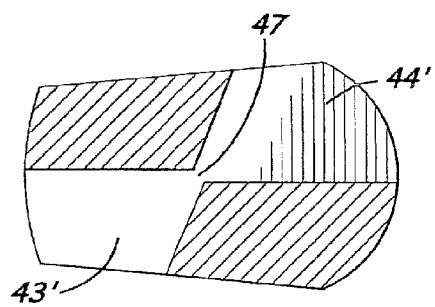
FIG. 12 is a cross-sectional view of the float in FIGS. 9-11, viewed along the line 12-12 in FIG. 10.
Figure 13:
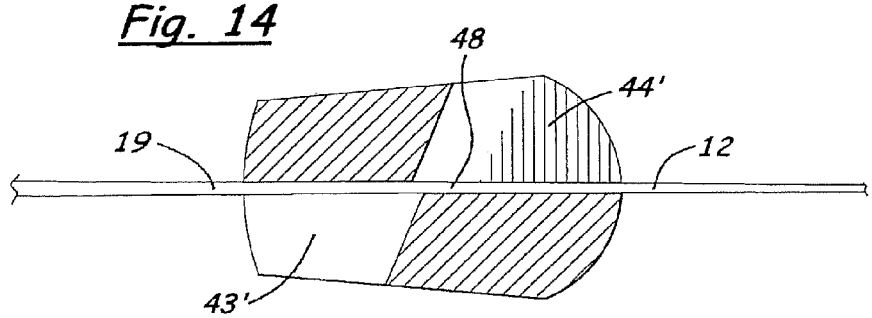
FIG. 13 is a cross-sectional view of the float in FIGS. 9-12, shown with the leader (not in cross-section) installed in the float.

Best visualized by referring to FIGS. 9, 12, and 13, the method of installing the float 40 on the leader/line may be described as follows: insert a right portion (12) of the leader into the right end slot 44 (by laying it down in the right slot that opens upward in the figures, wherein a wall 44' of slot 44 is visible in FIGS. 12 and 13); insert a left portion (19) of the leader into the left slot 43 (by pulling it upwards into the left slot that opens downward in the figures, wherein a wall 43' of slot 43 is visible in FIGS. 12 and 13); and laying the central portion (48) of the leader transverse to the length of the float in the transverse slot portion 46; and then pulling both ends of the leader, while guiding the leader into the Z-shaped slot 42, so that the portions of the leader slide through their respective slot portions to the central bore. In other words, the leader is inserted generally sideways into the Z-shaped slot, but the portions (12, 19, 48) of the leader approach the central bore 45 from different directions, or, in other words, through a circuitous slot or path to the bore. Once portions 12, 19, 28 are inside the float, the user will typically pull on opposite ends of the leader (12, 19) to put tension on the leader. This tension which will tend to straighten out the leader inside the float, resulting in the leader sliding all the way to the central bore 45 to extend straight through the float central bore 45, as shown in FIG. 13. In this position, the leader is received in the bottoms of the right and left end slots 43, 44 and in a very small central portion of the transverse slot (47), which bottoms and very small central portion join and align as the central bore 45 (see FIGS. 12 and 13).

After passing through the circuitous slot/path and straightening out, the leader is unlikely to come out of the float 40, as tension on it will tend to keep it straight in the bore 45. Also, typically, once the leader is installed inside the bore 45, the fisherman typically will slide the float 40 relative to the leader to a point wherein the thicker portion of the leader is "stuck" or "wedged" in the bore. This way, both the tight fit of the leader in at least a portion of the bore and the circuitous exit path (out through the Z-slot 42) tend to keep the float 40 in the desired location on the leader. Further, the right and/or left end slots 43, 44 and/or a part of them, may be adapted to be a snug or tight fit with the leader, if desired, as this will further decrease the chance that the float will come off the leader. In some embodiments, the fisherman may again pull the leader out of the float through the Z-shaped slot, if he/she wishes, but it will take some manipulation on his/her part and this will not tend to happen accidentally. As with a single bore and/or a simple side-slot according to embodiments of the invention, the method of frictional/interference attachment using a circuitous slot system also provides the benefit of being able to remove the float from the leader and reuse the float on another leader and/or at another time.

In a way similar to the discussion regarding the tightness of the slot 32 in the embodiment of FIGS. 5-8, the slot portions 43, 44 and 47 may be of various widths relative to the leader. The inventor prefers that at least one, and preferably two or all, of the slots 43, 44, 47 be sized to fit fairly snugly with the leader (a "close fit" or "a snug fit") as the leader is being slid sideways into the float, so that, in the reverse, it will not be easy for the leader to slide out of said slots. However, in less-preferred embodiments, not all of the slots/slot portions need to fit snugly with the leader as the leader slides through. For example, in less-preferred embodiments, if the two end slots 43, 44 are sized to fit snugly with the leader, then the transverse slot portion 47 may be relatively loose to help ease the insertion of a thicker portion of leader. Embodiments of the invention may comprise a frictional attachment of the float onto the leader merely by being slid sideways through slots such as these, wherein the bore fits tightly on the leader as soon as the leader is slid sideways into the bore, but it is preferred that the frictional attachment to "lock" the float onto the leader actually takes place, after the sideways installation of the float on the leader, when the float is slid axially farther up the leader to a thicker portion of the leader. Thus, in preferred circuitous-slot embodiments, once the leader is inserted into the float through the circuitous slot, the float is slid along the leader to create an interference fit between the bore and the leader and it is this interference float that serves as the sole connection between the float and the leader. If the float were to become loosened from the interference fit, the leader would still be "trapped" inside the float whereby the only exit for the leader from the float is a circuitous, and, hence, difficult path.

Figure 14:
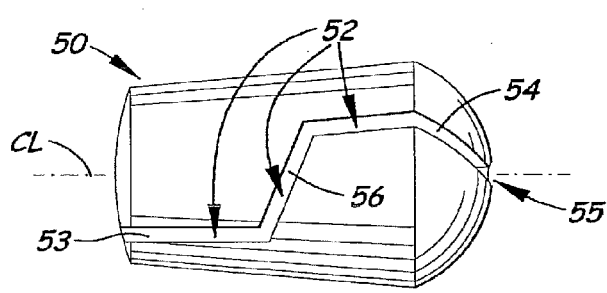
FIG. 14 is a side view of an alternative embodiment of a float with a "Z-side-slot," wherein the two end slot portions are less than 180 degrees apart.

FIG. 14 illustrates another embodiment of a float 50 that has a Z-shaped slot 52, but wherein the "right and left" end slot portions are not 180 degrees apart. Because the end slots 53, 54 are less than 180 degrees apart, both end slots 53, 54 are visible in FIG. 14. The right and left end slots 53, 54, in this embodiment, are approximately 90 degrees apart. Again the right and left end slots "bottom-out" at the central axis (CL), forming the majority of the central bore 55, and the transverse slot portion 56 connects the end slots 53, 54 at generally the center of the float. As in the above-detailed method, the leader may be inserted into all three portions of the slot at the roughly the same time (the end slots 53, 54 and the transverse slot portion 56), and with moderate pulling of the leader ends, the leader will tend to snap or slid toward the center axis of the float 50 to straighten out in the bore 55 at the central axis CL.

Many other configurations and angles may be used for embodiments of the non-straight slot systems. For example, angles other than 180 or 90 degrees may be used. For example, end slots may be very close to each other (as little as 1 degree apart, but this is less preferred due to the difficulty of straightening the leader in the float) or very far apart (as much as 180 degrees apart). More preferably, to facilitate the insertion and straightening of the leader in the float, the end slots are between 90 and 180 degrees from each other, and most preferably about 135 degrees from each other.

Even more circuitous slots may be used, such as slots with more slot portions by virtue of more "twists and turns," and/or non-straight/non-planar slot portions. For example, instead of a Z-slot with a planar right end slot, a planar left end slot, and a planar transverse slot, any one or more of the slot portions may be curved. For example, the end slot portions may be planar and the transverse (connecting) slot portion may be curved. Or, each end slot may be curved and the transverse slot may be planar. Or, one of the other of the end slot portions may be curved and the other portions may be curved. By curved, it is meant that the walls that form the slot portion are not planar, which would also result in the opening to the slot not being straight but instead having a curved appearance. Preferably, still, all the various slot portions communicate with each other to form a straight or substantially straight bore through the float.

The floats may be of various materials, shapes, and sizes, but, for fly-fishing, will typically be approximately ¾ inch long by about ½ inch in diameter. It is desired to maintain the float at a weight of 10 grains or less, more preferably, ¾-3 grains, and most preferably 1-2 grains. For a reference, a standard fly for fly-fishing weighs about 2 grains, so that the most preferred float embodiments are about the same weight as a fly. Elongated, spherical, conical, and/or other shapes may be used, but it is preferred that a rounded, or elongated and rounded-end, shape be used. Various foam, plastics, or other floating materials may be used for the floats of the preferred embodiments. Floats with slots may need to be made of more dense and typically heavier material to strengthen the floats, as the slot(s) tend(s) to weakens such floats and allow more fractures.

FIGS. 15-31 illustrate embodiments of the invented float/strike indicator that are attached by axial insertion of the tippet end of the leader into and through the bore of the float, followed by the user pulling the leader to wedge a thicker portion of the leader in the float, as described above for other embodiments. The preferred embodiments in FIGS. 15-31 feature elongated float main bodies with rounded ends, which are substantially solid and which preferably have only a single bore through the length of the bore at or very near to the central axis of the float. The "single bore" need not have only a single diameter, however, as it may be tapered, have multiple diameters, and/or have enlarged end openings and/or the tapered ends. Preferably, there are no side-ways slots/slits in the floats of FIGS. 15-31. The floats illustrated in FIGS. 15-31 have smaller ends facing away from the fly, for improved aerodynamics during the forward step of the fly-fishing cast wherein the smaller end of the float will be moving forward in the air, away from the fisherman. Alternative main body shapes, however, could be used.

FIGS. 15 and 16 illustrate float embodiments 60, 70 that feature elongated bores having a constant diameter along all, or along a significant portion, of the bore. FIG. 15 has a funnel-shaped opening 62 at one end of the float, which funnel-shaped opening 62 is the end into which the tippet of the leader is inserted when the float is to be installed on the leader. The preferred funnel-shaped opening 62 is generally conical in shape, but other enlarged end openings into the bore may be effective. A funnel-end or other enlarged end has a maximum diameter preferably 2-5 times the diameter of the main portion 64 of the bore (the "main diameter"), which enlarged opening gives the user a larger target when trying to thread the leader into the bore. The funnel-end or other enlarged end opening preferably extends only about ⅙-¼ of the way along the length of the bore and the float, and the remainder of the bore, the bore main portion 64, is a straight, constant-diameter cylindrical bore.

As illustrated in FIG. 15, a tapered leader gently inserted into the constant-diameter portion of the bore will not exhibit a tight fit between the outer surface of the leader and the bore surface all along the length of the bore. However, upon pulling the leader farther through the float (leader being pulled to the right in FIG. 15), the leader will become even more tightly wedged in the float causing the float material to compress slightly to conform to the size and shape of the leader, thus providing a tight, gripping fit between the leader and the bore all along the length of the bore.

In FIG. 16, the float 70 has the same constant-diameter bore of the float of FIG. 16, but without the funnel-end or other enlarged end opening. As in the embodiment of FIG. 15, a tapered leader gently inserted into the constant-diameter bore 74 of FIG. 16 will not exhibit a tight fit between the outer surface of the leader and the bore surface all along the length of the bore. However, upon pulling the leader through the float farther to the right in FIG. 16, the float material will compress slightly as the leader is wedged in the float, providing a tight, gripping fit between the leader and the bore all along the length of the bore.

FIGS. 17 and 18 illustrate embodiments 80, 90 that feature bores having a tapered diameter along all, or along a significant portion, of the bore. FIG. 17 has a funnel-shaped opening 82 at one end of the float, as in FIG. 15. The funnel-shaped opening or other enlarged end opening preferably extends only about ⅙-¼ of the way along the length of the bore and the float, and the remainder of the bore is a straight bore tapering smoothly from a larger diameter at the left to a narrow diameter at the right.

Depending on the taper of the bore main portion 84 in the embodiment 80 of FIG. 17, a tapered leader gently inserted into the bore may or may not exhibit a tight fit between the outer surface of the leader and the bore surface all along the length of the bore. In the event that the taper of the bore does not match the taper of the leader, there will be some regions of the bore that do not contact/mate with the leader, until the leader is pulled farther to the right in FIG. 17, and the float material compresses slightly to conform to the size and taper of the leader to provide a tight, gripping fit between the leader and the bore all along the length of the bore.

In FIG. 18, there is shown the float of FIG. 17 but without the funnel-end. As with the float of FIG. 17, if the taper of the bore matches the taper of the leader, a tight fit between the bore 94 and the leader all along the length of the float is easily achievable. However, in the event that the taper of the bore does not match the taper of the leader, there will be some regions of the bore that do not contact/mate with the leader, until the leader is pulled farther through the float to achieve the desired compression of the float material and resulting tight, gripping fit all along the length of the bore.

FIGS. 19-22 illustrate embodiments 100, 110 that comprise a constant or substantially constant-diameter bore main portion and a significantly-tapered portion at the end of the float that is near the fly (the "fly-end" of the float). By "significantly-tapered," it is meant that the bore goes from its full diameter (the diameter of the bore main portion) to a fraction of that diameter (or nearly closed) within about ⅙-⅓ of the length of the bore, and, more preferably, about within about ¼ of the length of the bore. The "full diameter" or "main diameter" is preferably sized, as described below, to be between the diameters of the thickest ends and the thinnest ends of conventional leaders (preferably 0.014-0.020 inches), and the significantly-tapered portion is preferably sized to taper to a diameter about 20-70 percent, or more preferably about 30-60 percent of the bore main diameter. To accommodate 3× through 6× leaders (see table below, 3×, 4×, 5×, and 6×) for example, the significantly-tapered portion would taper down to about a 0.009 inch diameter so that the leader tippet can be inserted through said significantly-tapered portion for access prior to the user pulling said tippet end of the leader. To accommodate 6× and 7× leaders, the significantly-tapered portion could taper down to about a 0.006 inch diameter. Thus, in these examples, the wall of the bore in that significantly-tapered region could be slanted from 0.014-0.020 (inward and toward the end of the float) to a 0.009 inch diameter, and a 0.006 inch diameter, respectively. Optionally, these floats also have a funnel-shaped end or other enlarged end opening at the opposite end of the float, that is, the end of the float that is normally away from the fly.

FIG. 19 illustrates one float 100 having an embodiment of said "significantly-tapered" portion 106 (hereafter "tapered portion") at the fly-end of the float. This embodiment also has a funnel-end 102 that allows easier threading of the tippet end of the leader into and through the float. Note that, in FIG. 20, a leader has been inserted through the float, and, in response to the force of the user pulling the leader through the float, the float material in the area of the tapered portion has compressed and/otherwise given way to the leader to an extent that the leader fits through said tapered portion and the leader is gripped firmly by the compressed tapered portion 106'. The diameter of the non-tapered portion (the bore main portion 104) is preferably sized, as described below, to be between the diameters of the thickest ends and the thinnest ends of conventional leaders (preferably 0.014-0.020 inches), and so the leader may be pulled to an extent wherein the tapered portion fits tightly on the leader and the non-tapered portion also fits tightly on the leader and/or also compresses slightly to grip the leader. The diameter of the non-tapered portion (the bore main portion 104) is portrayed as constant in FIG. 19, but, in alternative embodiments, it may be tapered (albeit not as tapered as the tapered portion).

Figure 21:
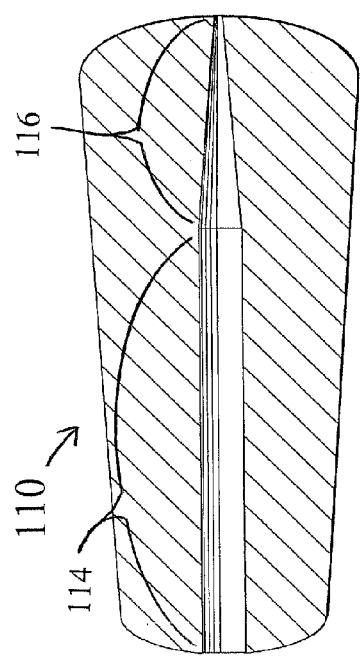
FIGS. 21 and 22 are cross-sectional views of another embodiment of float according to the invention that is the same as the float in FIGS. 19 and 20 except without the enlarged end opening. The leaders portrayed in FIGS. 21-22 are not shown in cross-section.
Figure 22:
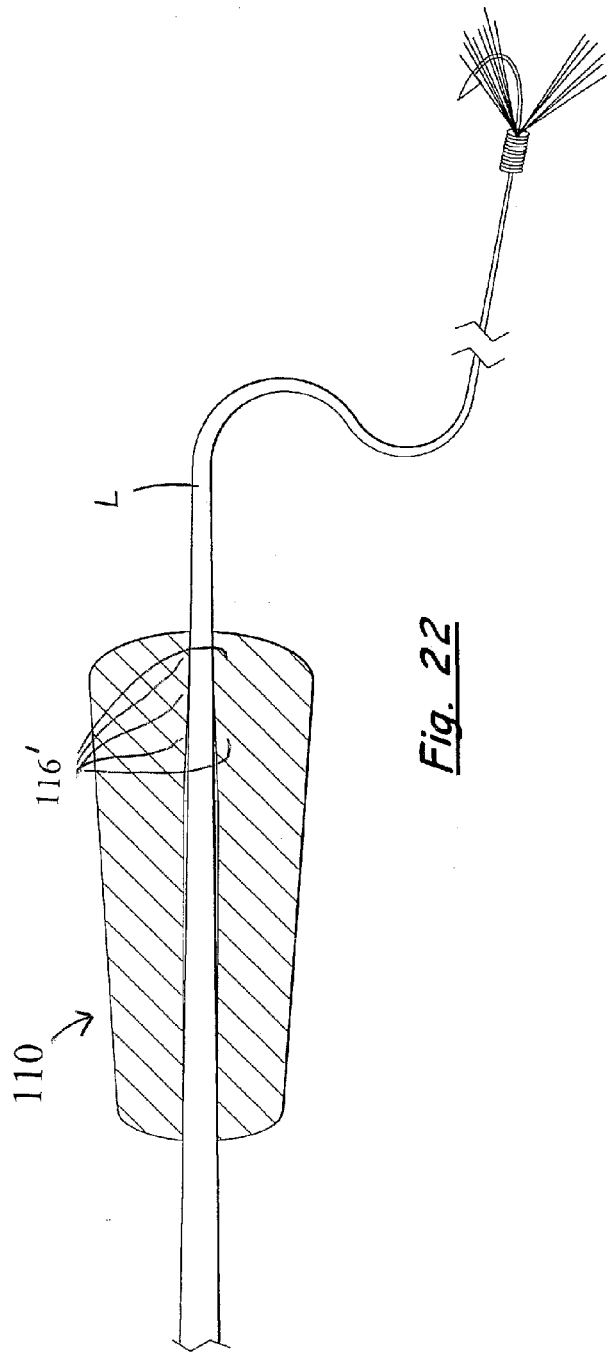

FIGS. 21 and 22 illustrate an embodiment 110 very similar to the float of FIGS. 19 and 20, except that this float 110 does not comprise an enlarged end opening for threading the leader into the float. It is believed that most fishermen will be able to thread the tippet end of the leader into and through the float easily enough, and that, after said threading, the tippet will be exposed from the fly-end of the float and the fisherman can grab the tippet to pull the leader as described above. The tapered portion 116 and the non-tapered portions (the bore main portion 114) of the float in FIGS. 21 and 22 will perform as described above for the float of FIGS. 19 and 20, wherein pulling the leader through the float 110 will cause float material in the area of the tapered portion to compress and/otherwise given way to the leader to an extent that the leader fits through said tapered portion and the leader is gripped firmly by the compressed tapered portion 116'. The diameter of the non-tapered portion is portrayed as constant, but, in alternative embodiments, it may also be tapered (albeit not as tapered as the tapered portion).

The structures and methods disclosed herein may be used to attach objects other than floats to a line, leader, wire, string, etc. Preferably, the methods of attachment involves solely a friction or interference fit between the line, leader, string, wire, etc., and the float or other object, and does not include rubber tubes or grommets, rubber pieces or wire loops, knotting or kinking of the leader/line. The preferred floats are attached to knotless, tapered, conventional leaders. For float embodiments that include taper in their bore, the dimensions of the extremities (butt and tip) of the leader may be used to calculate the amount of taper that may be desired in the bore to make the bore taper equal or approximately equal to the taper of the leader. The preferred floats may be installed above tippet knots (by sideways installation), where the axial sliding of the float, to frictionally "lock" the float onto the leader. The preferred floats, when used in fly fishing are secured on the leader, by the methods herein described, at about 2-10 feet from the fly and, most typically, about 3-8 feet from the fly.

The diameter of the float bore (or, in embodiments wherein different portions of the bore have different diameters, the "main diameter" or "full diameter," which is the diameter of a substantial portion (along >50% of the length) of the float bore) is preferably sized to be, on average, about midway between the smallest and the largest diameters of the leader. Conventional leaders typically have the following diameters:

| Leader Size | Butt Diameter, inches (Thickest End) | Tip Diameter, inches (Thinnest End) |
| --- | --- | --- |
| 0x | 0.026 | 0.011 |
| 1x | 0.026 | 0.010 |
| 2x | 0.024 | 0.009 |
| 3x | 0.024 | 0.008 |
| 4x | 0.023 | 0.007 |
| 5x | 0.022 | 0.006 |
| 6x | 0.021 | 0.005 |
| 7x | 0.021 | 0.004 |

Therefore, a bore main diameter (or average bore main diameter in cases wherein the bore main portion is tapered as in FIG. 18) of less than 0.021 inches and greater than 0.011 inches would attach, as described in the preferred methods, to any and all of the above-listed tapered leaders. A bore main diameter (or average bore main diameter) in the range of 0.014-0.020 inches is preferred and would attach, as described in the preferred methods, to an acceptable generally middle location on any and all of these leaders.

Figure 23:
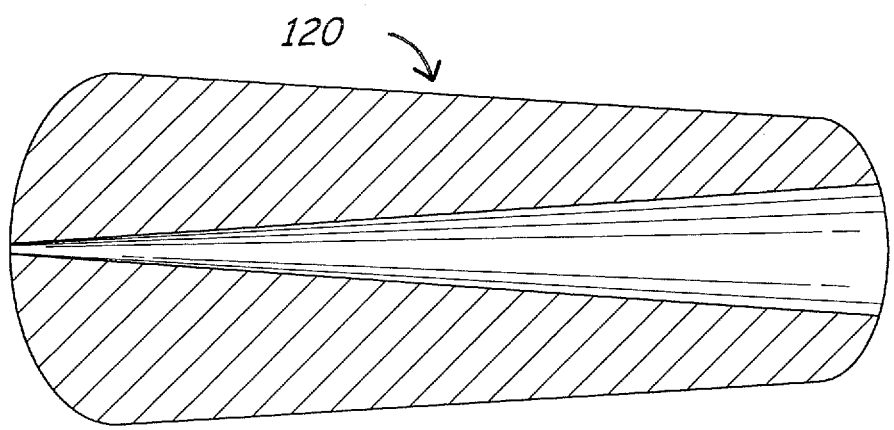
FIGS. 23-25 are side cross-sectional views of three embodiments of floats/indicators that each have a longitudinal bore, without any side-slot, so that the line/leader is inserted into the large-diameter end of the bore and pulled tight within the bore by abutment/engaging the smaller-diameter region/end of the bore.
Figure 24:
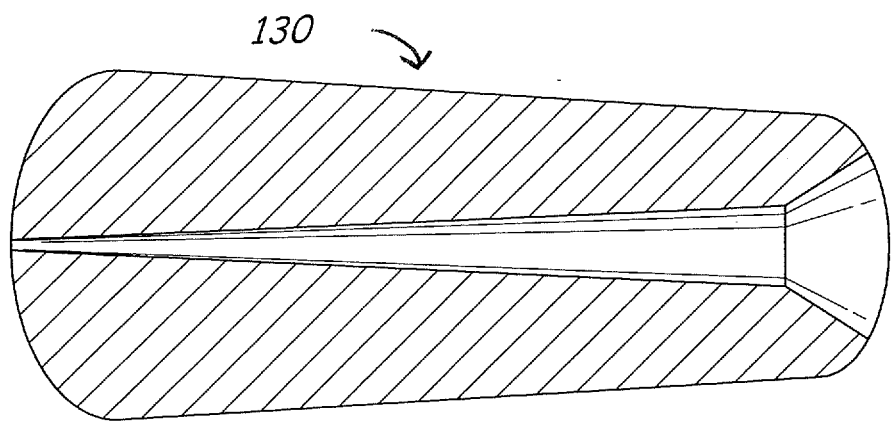
Figure 25:
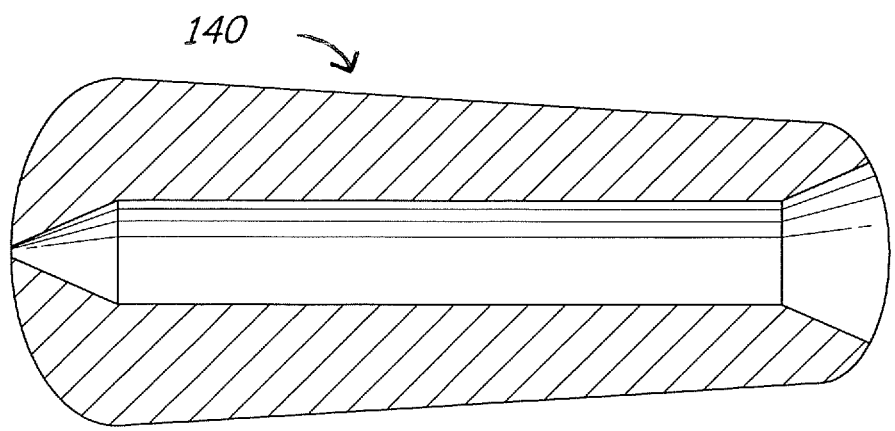
Figure 26:
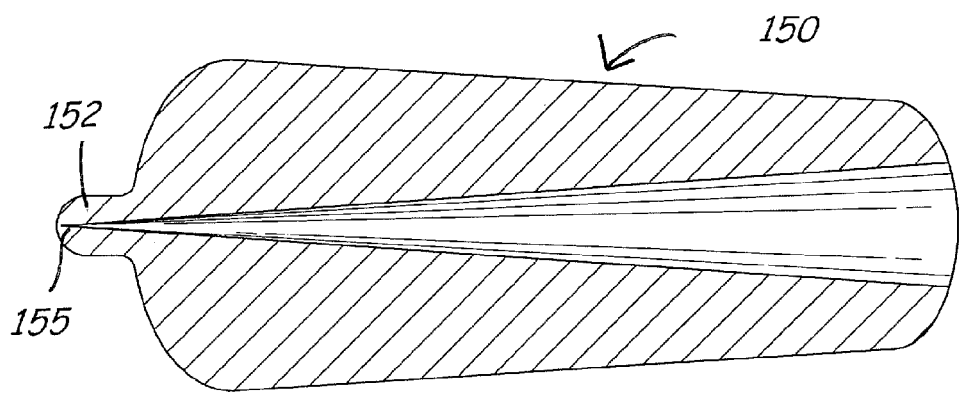
FIGS. 26-28 are similar to FIGS. 23-25, respectively, except that the float embodiments of FIGS. 26-28 include a protrusion (bump, knob, mound, extension, for example) that extends out from one end of the float and has inside the small-diameter of the bore.
Figure 27:
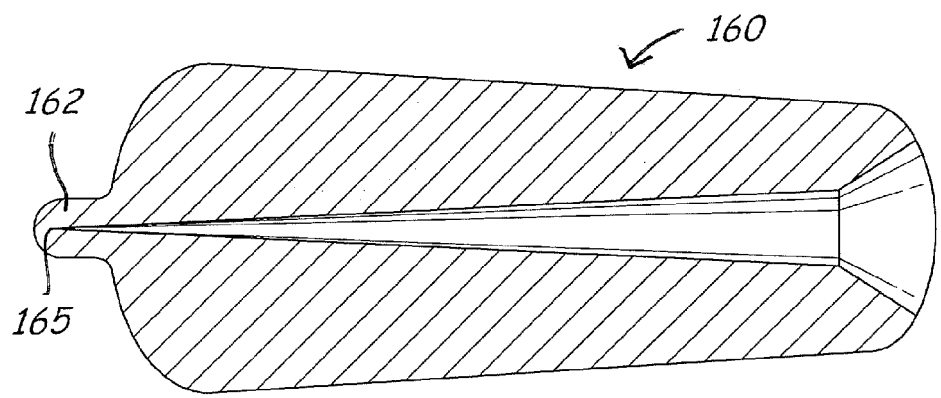
Figure 28:
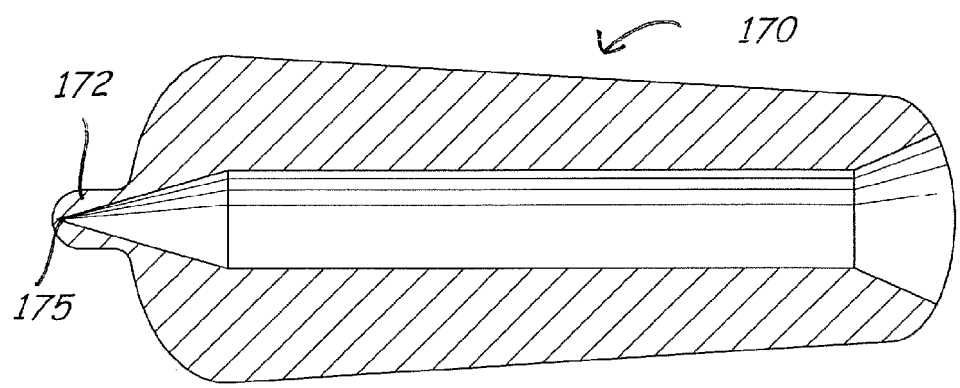
Figure 29:
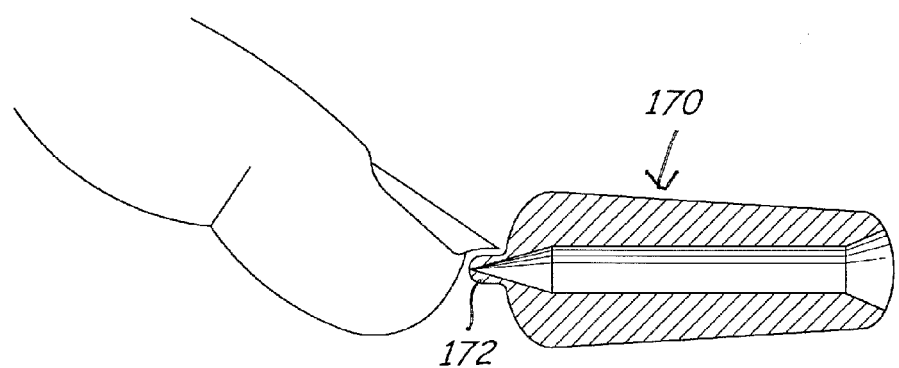
FIGS. 29-31 illustrate how an embodiment of the float (here, the embodiment from FIG. 28, as an example) may have its protrusion snapped or cut off to reveal the small-diameter end of the bore so that the line/leader may be pushed all the way through the float and pulled to tighten the line/leader in the float, especially in the small-diameter region of the float.
Figure 30:
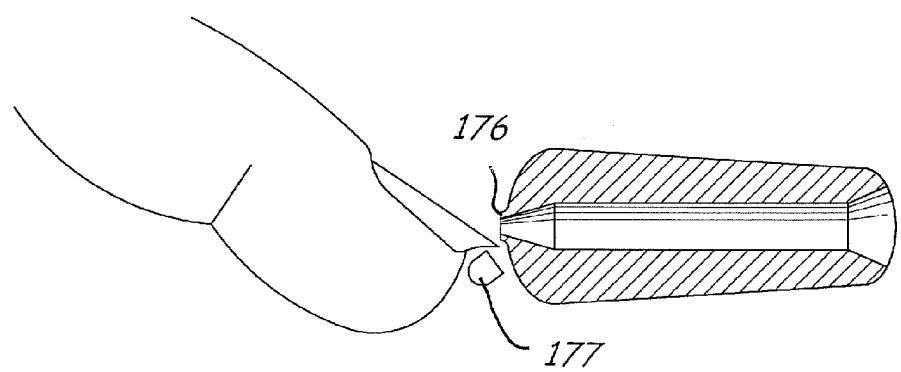
Figure 31:

FIGS. 23-25 illustrate additional floats of the general shape and structure discussed above for FIGS. 17-22, wherein at least a portion of the longitudinal bore is tapered in order to tightly engage the line/leader. Preferably, these floats have no side slot/slit extending from the side of the float inward to the bore. Thus, the line/leader is inserted into the end of the float, into a larger-diameter region of the bore and pushed to the opposite end, where the user may grasp the line/leader, when a small length/portion of the line/leader is accessible outside the small diameter end of the bore, and pull the line/leader relative to the float until the float is tight on the line/leader. As discussed previously in this document, the float then preferably does not move on the line/leader unless the user purposely forces it to more. Therefore, the float is "fixed" to the line/leader by this structure and method during use, without grommets or other structure, and does not slide or move relative to the line/leader during use.

The float 120 in FIG. 23 has a tapered bore, with the diameter smoothly decreasing from one end to the other, without any "corners" or abrupt changes in diameter, so that the taper extends smoothly all the way from one end to the other. The float 130 in FIG. 24 has a smoothly tapered bore in most of the float, with an outwardly-flared bore end at the small end of the float, which makes line/leader insertion easier. The float 140 in FIG. 25 has a bore with a straight main region (non-tapered, constant diameter) and tapered ends; the bore tapers (flares) outward to a larger diameter at the small end of the float, and the bore tapers inward to a small diameter at the large end of the float. In these embodiments, the small diameter end of the bore is in the large diameter of the float, due to the preferred aerodynamics of the float (for the preferred cast and lay-out of the leader and fly and the preferred direction of inserting the line/leader) but alternative shapes and arrangements may be envisioned. In these embodiments, the small diameter bore end extends all the way to the outermost end of the float and is not blocked or closed; this way, the bore may be said to be open at both ends of the float prior to installation.

The line/leader will engage and preferably slightly compress the surface of the small diameter of the bore. The relative diameters and dimensions of the bore and the line/leader, as discussed earlier, are preferably adapted so that a tight and immovable fit, under the normal forces of use in fishing, is made between the line/leader, and this may be done with some compression (from the inside out) of the material of the float. For example, a styrofoam or other foam or plastic may be used that will grip and/or compress slightly when the line/leader is pulled relative to the float to be tight in the float.

FIGS. 26-31 illustrate alternative embodiments, floats 150, 160, 170, that employ an extra feature for ensuring quality and accurate molding or forming of the float to have a properly sized and shaped bore, especially at the small diameter bore end. Also, this extra feature may ensure convenient use and a tight fit of a line/leader with the float. The extra feature is a protrusion 152, 162, 172 from one end of the float, into which the small diameter bore end extends. The protrusion in FIGS. 26-31 is a rounded "mound" integral with the outermost surface of the large end of the float, but it may also be other shapes, such as more oval, longer, and/or flatter. It is preferred that the protrusion be significantly smaller in diameter than the end of the float main body from which it protrudes, for example, in the range of 1/3-1/20 of the diameter of the end of the main body, and, more preferably, in the range of 1/5-1/10 of the diameter of said end of the main body. The protrusion is preferably closed-ended at its outermost end, with the small diameter bore end preferably extending nearly all the way to said outermost surface of the protrusion. In some embodiments, the small diameter bore end may actually extend all the way to the outermost surface of the protrusion (for example, the tip 155, 165, 175 where the bore end diameter is extremely small). In the preferred embodiments, however, there is some float material between the tip of the bore and the outermost surface of the protrusion. Therefore, prior to installation, one may call the bore "closed" or "covered" on one end of the float.

Therefore, when installation begins, a user will snap or cut off at least a portion of the protrusion, in order to reveal the small diameter bore end, specifically, the bore end minus a very-small-diameter portion of the bore end from the bore end's outermost region. This way, the bore end is revealed and accessible at a location 176 wherein the bore end is the desired diameter for receiving the line/leader and for the user being able to insert the line/leader all the way through the bore and access it at the end of the float (the end to the left in FIGS. 26-31). The snapping/cutting of the outer portion 177 of the protrusion may be done by a fingernail, a clipper, or other device. In some embodiments, the user may remove, by cutting or scraping, more of the protrusion, even extending slightly into the main body of the bore, but, with proper sizing of the bore relative to the line/leader, this should not be necessary. Removing just the protrusion or a substantial part of the protrusion retains the strength and operability of the main body of the float.

As discussed for FIGS. 23-25, and for some of the other embodiments earlier in this document, the line/leader will engage and preferably slightly compress the surface of the small diameter of the bore of the floats 150, 160, 170. This engagement and slight compression will be, for the embodiments represented by FIGS. 26-31, particularly in the tapered region of the bore remaining after removal of the protrusion. The relative diameters and dimensions of the bore and the line/leader, as discussed earlier, are preferably adapted so that a tight and immovable fit, under the normal forces of use in fishing, is made between the line/leader, and this may be done with some compression (from the inside out) of the material of the float. For example, a styrofoam or other foam or plastic may be used that will grip and/or compress slightly when the line/leader is pulled relative to the float to be tight in the float. The preferred protrusion of these embodiments is integrally formed by molding of the float, and the protrusion is preferably the same material as the main body of the float.

The preferred embodiments of the float/strike indicator are employed in fly-fishing with a tapered leader; they may be extremely light-weight, are non-moving relative to the leader at all times after installation and during use, and do not interfere with, or cause significant resistance during, fly-casting. Many embodiments of the invention may also be employed in bait or lure fishing on a fishing line. The extreme light weight of the floats/indicators is possible because they require no grommets or other attachment members and rely solely on the frictional/interference fit between the float/indicator and the leader/line.

Some embodiments of the invention may therefore be described as: a fishing leader and float combination comprising: a tapered fly-fishing leader having a tip end, a butt end, and an outer surface between said tip end and said butt end, wherein the tip end has a smaller diameter than the diameter of the butt end and the outer surface is tapered from said larger diameter butt end to said smaller diameter tip end; a float attached to said leader, the float comprising a single main body and a single bore through the main body, the single bore extending along a longitudinal axis of the float between a first end of the float and a second end of the float, the single bore comprising a region that tapers from a first diameter at or near the first end of the float to a second diameter at or near the second end of the float that is smaller than said first diameter; and a protrusion extending from the second end of the float that is smaller in diameter than the second end of the float, and wherein the bore extends into the protrusion to form a hollow interior of the protrusion, so that removal of the protrusion will open the bore to the outside surface of said second end of the float; wherein the leader extends through the bore, after removal of the protrusion, and said float is secured to the leader and immovable on the leader only by means of an interference fit between the float bore and the tapered outer surface of the leader.

Other embodiments of the invention may be described as: a fishing leader and float combination comprising: a tapered fly-fishing leader having a tip end, a butt end, and an outer surface between said tip end and said butt end, wherein the tip end has a smaller diameter than the diameter of the butt end and the outer surface is tapered from said larger diameter butt end to said smaller diameter tip end; a float attached to said leader, the float comprising a single main body and a single bore through the main body, the single bore extending along a longitudinal axis of the float between a first end of the float and a second end of the float, the single bore comprising at a middle region that has a constant diameter, an outwardly-tapered flared end at the first end of the float, and an inwardly-tapered tip end at the second end of the float; and a protrusion extending from the second end of the float that is smaller in diameter than the second end of the float, and wherein the tip end of the bore extends into the protrusion to form a hollow interior of the protrusion, so that removal of the protrusion will open the top end of the bore to the outside surface of said second end of the float; wherein the leader extends through the bore, after removal of the protrusion, and said float is secured to the leader and immovable on the leader only by means of an interference fit between the float bore and the tapered outer surface of the leader.

Also, methods have been invented, including embodiments that may be described as a method of installing a float on a fishing leader, the method comprising: providing a tapered fly-fishing leader having a tip end, a butt end, and an outer surface between said tip end and said butt end, wherein the tip end has a smaller diameter than the diameter of the butt end and the outer surface is tapered from said larger diameter butt end to said smaller diameter tip end; providing a float comprising a single main body and a single bore through the main body, the single bore extending along a longitudinal axis of the float between a first end of the float and a second end of the float, the single bore comprising a region that tapers from a first diameter at or near the first end of the float to a second diameter at or near the second end of the float that is smaller than said first diameter, and the float further comprising a protrusion extending from the second end of the float that is smaller in diameter than the second end of the float, and wherein the bore extends into the protrusion to form a hollow interior of the protrusion; removing said protrusion from the second end of the float by snapping or cutting the protrusion off of the float, so that the bore opens to the outside surface of said second end of the float; inserting the leader tip end into the bore at the first end of the float and pushing it through the float to exit the bore at the second end of the float where the protrusion has been removed from the float; and pulling the leader further through the bore to an extent that the tapered outer surface of the leader wedges in the bore so that the float is secured to the leader and immovable on the leader only by means of an interference fit between the float bore and the tapered outer surface of the leader.

Also, invented methods may be described as a method of installing a float on a fishing leader, the method comprising: providing a tapered fly-fishing leader having a tip end, a butt end, and an outer surface between said tip end and said butt end, wherein the tip end has a smaller diameter than the diameter of the butt end and the outer surface is tapered from said larger diameter butt end to said smaller diameter tip end; providing a float comprising a single main body and a single bore through the main body, the single bore extending along a longitudinal axis of the float between a first end of the float and a second end of the float, the single bore comprising at a middle region that has a constant diameter, an outwardly-tapered flared end at the first end of the float, and an inwardly-tapered tip end at the second end of the float, and the float further comprising a protrusion extending from the second end of the float that is smaller in diameter than the second end of the float, and wherein the bore extends into the protrusion to form a hollow interior of the protrusion; removing said protrusion from the second end of the float by cutting or snapping the protrusion off of the float, so that the bore opens to the outside surface of said second end of the float; inserting the leader tip end into the outwardly-tapered flared end and pushing it through the float to exit the second end of the float where the protrusion has been removed; and pulling the leader further through the bore to an extent that the tapered outer surface of the leader wedges in the bore so that the float is secured to the leader and immovable on the leader only by means of an interference fit between the float bore and the tapered outer surface of the leader.

Although this invention has been described above with reference to certain particular means, materials, and embodiments, it is to be understood that the invention is not limited to these disclosed particulars, but extends instead to all equivalents within the broad scope of the claims.

The invention claimed is:

1. A fishing leader and float combination comprising:
a tapered fly-fishing leader having a tip end, a butt end, and an outer surface between said tip end and said butt end, wherein the tip end is smaller in diameter than the butt end and the outer surface is tapered from said butt end to said tip end;
a float comprising a single main body with a first float end and a second float end, a protrusion extending from the second float end that is smaller in diameter than the second float end, and a single bore extending through the main body along a longitudinal axis of the float between the first float end and the second float end, wherein the protrusion is closed at an outermost end thereof and a tapered region of the single bore extends only part way into the protrusion to form a hollow interior of the protrusion so that the single bore is closed at said second float end until removal of the protrusion opens the single bore to an outside surface of said second end of the float;
wherein, after removal of the protrusion, the leader extends through the bore, and the combination does not comprise any member in the bore of the float except said leader, and said float is fixed directly to the leader and immovable on the leader during fishing only by means of an interference fit between the float bore and the tapered outer surface of the leader.

2. A combination as in claim 1, wherein the tapered region tapers from a first diameter at or near the first float end to a second diameter inside the protrusion that is smaller than said first diameter.

3. A combination as in claim 2, wherein the tapered region tapers from said first diameter near the first float end to said second diameter inside the protrusion and said single bore further has a flared region at the first float end that is enlarged in diameter compared to said first diameter of the tapered region of the single bore, so that said flared region is a largest-diameter portion of the single bore.

4. A combination as in claim 3, wherein said first float end is smaller in diameter than said second float end, and said protrusion is smaller in diameter than both of said first and second float ends.

5. A combination as in claim 1, wherein said single bore further comprises a middle region that has a constant diameter, and wherein a first bore end at the first float end is flared to have a larger diameter than said constant diameter of the middle region of the single bore.

6. A fishing leader and float combination comprising:
a tapered fly-fishing leader having a tip end, a butt end, and an outer surface between said tip end and said butt end, wherein the tip end is smaller in diameter than the butt end and the outer surface is tapered from said butt end to said tip end;
a float comprising a single main body and a single bore through the main body, the single bore extending along a longitudinal axis of the float between a first end of the float and a second end of the float and having a first bore end and a second bore end, the single bore comprising a region that tapers from a first diameter at or near the first end of the float to a second diameter at or near the second end of the float that is smaller than said first diameter;
a protrusion extending from the second end of the float that is smaller in diameter than the second end of the float, wherein the protrusion is closed at an outermost end thereof and the single bore extends only part way into the protrusion to form a hollow interior of the protrusion, so that the second bore end is closed until removal of the protrusion opens the bore to an outside surface of said second end of the float;
wherein, after removal of the protrusion, the leader extends through the bore, the combination does not comprise any member in the bore of the float except said leader, and said float is fixed directly to the leader and immovable on the leader during fishing only by means of an interference fit between the float bore and the outer surface of the leader.

7. A combination as in claim 6 that does not comprise any rubber grommet contacting the float and does not comprise any rubber grommet contacting the leader.

8. A combination as in claim 6, wherein said protrusion extending from the second end of the float has a diameter that is in the range of 1/5-1/10 of a diameter of said second end of the float.

9. A combination as in claim 6, wherein said bore further has a flared region at the first end of the float that is enlarged in diameter compared to said first diameter of the bore, so that said flared region is a largest-diameter portion of the bore.

10. A combination as in claim 6, wherein the main body has a side surface and does not comprise any slot from the side surface to said bore.

11. A fishing leader and float combination consisting of:
a tapered fly-fishing leader having a tip end, a butt end, and an outer surface between said tip end and said butt end, wherein the tip end has a smaller diameter than a diameter of the butt end and the outer surface is tapered from said butt end to said tip end;
a float comprising a single main body with a first float end and a second float end, a protrusion extending from the second float end that is smaller in diameter than the second float end, and a single bore extending through the main body along a longitudinal axis of the float between the first float end and the second float end, wherein the protrusion is closed at an outermost end thereof and a tapered region of the single bore extends only part way into the protrusion to form a hollow interior of the protrusion so that the single bore is closed at said second float end until removal of the protrusion opens the single bore to an outside surface of said second end of the float;
wherein the leader extends through the bore after removal of the protrusion, the combination does not comprise any member in the bore of the float except said leader, and said float is fixed directly to the leader and immovable on the leader during fishing only by means of an interference fit between the float bore and the tapered outer surface of the leader.

12. A combination as in claim 11, wherein the tapered region tapers from a first diameter at or near the first float end to a second diameter inside the protrusion that is smaller than said first diameter.

13. A combination as in claim 12, wherein the tapered region tapers from said first diameter near the first float end to said second diameter inside the protrusion and said single bore further has a flared region at the first float end that is enlarged in diameter compared to said first diameter of the tapered region of the single bore, so that said flared region is a largest-diameter portion of the single bore.

14. A combination as in claim 13, wherein said first float end is smaller in diameter than said second float end, and said protrusion is smaller in diameter than both of said first and second float ends.

15. A combination as in claim 11, wherein said single bore further comprises a middle region that has a constant diameter, and wherein a first bore end at the first float end is flared to have a larger diameter than said constant diameter of the middle region of the single bore.

16. A method of installing a float on a fishing leader, the method comprising:
providing a tapered fly-fishing leader having a tip end, a butt end, and an outer surface between said tip end and said butt end, wherein the tip end has a smaller diameter than a diameter of the butt end and the outer surface is tapered from said butt end to said tip end;
providing a float comprising a single main body and a single bore through the main body, the single bore extending along a longitudinal axis of the float between a first end of the float and a second end of the float and having a first bore end and a second bore end, the single bore comprising a region that tapers from a first diameter at or near the first end of the float to a second diameter at or near the second end of the float that is smaller than said first diameter, and the float further comprising a protrusion extending from the second end of the float that is smaller in diameter than the second end of the float, wherein the protrusion is closed at an outermost end thereof, and wherein the single bore extends only part way into the protrusion to form a hollow interior of the protrusion so that the second bore end is closed;
removing said protrusion from the second end of the float by snapping or cutting the protrusion off of the float, so that the bore opens to an outside surface of said second end of the float;
attaching the float to said leader by:
inserting the leader tip end into the bore at the first end of the float and pushing the leader tip end through the float to exit the bore at the second end of the float where the protrusion has been removed from the float so that the leader extends through the bore; and
pulling the leader further through the bore to an extent that the tapered outer surface of the leader wedges in the bore with no member in the bore of the float except said leader so that the float is fixed directly to the leader and immovable on the leader during fishing only by means of an interference fit between the float bore and the tapered outer surface of the leader.

17. A method as in claim 16, wherein no rubber grommet is inserted into the bore.

18. A method as in claim 16 wherein said protrusion extending from the second end of the float has a diameter that is in the range of 1/5-1/10 of a diameter of said second end of the float.

19. A method as in claim 16, wherein said bore further has an outwardly-flared region at the first end of the float that is enlarged in diameter compared to said first diameter of the bore, so that said outwardly-flared region is a largest-diameter portion of the bore and said step of inserting the leader tip end into the bore at the first end of the float comprises inserting the tip end into said outwardly-flared region.

* * * * *